United States Patent [19]

Kimura

[11] 4,176,428
[45] Dec. 4, 1979

[54] PANEL FASTENER

[75] Inventor: Shigeru Kimura, Kamakura, Japan

[73] Assignee: Nifco, Inc., Tokyo, Japan

[21] Appl. No.: 875,275

[22] Filed: Feb. 6, 1978

[30] Foreign Application Priority Data

Feb. 5, 1977 [JP] Japan ................... 52-11223

[51] Int. Cl.² ............................................. A44B 21/00
[52] U.S. Cl. .................... 24/73 P; 24/217 R
[58] Field of Search ............ 24/73 FF, 73 MF, 73 P,
24/73 PF, 73 PM, 73 PP, 73 D, 73 S, 73 HS,
108, 216, 217

[56] References Cited

U.S. PATENT DOCUMENTS

| 809,351 | 1/1906 | Wotzel | 24/217 |
| 1,702,855 | 2/1929 | Swanson | 24/217 |
| 3,988,808 | 11/1976 | Poe et al. | 24/73 P |

FOREIGN PATENT DOCUMENTS

| 271725 | 4/1964 | Australia | 24/73 FT |
| 1561601 | 3/1967 | France | 24/73 FT |

*Primary Examiner*—Kenneth Dorner
*Attorney, Agent, or Firm*—Jack R. Halvorsen; Robert W. Beart

[57] ABSTRACT

A fixing device including a male member adapted to be fixed to a decorating panel and a complimentary female retaining member adapted to be attached to a supporting panel. The male member is provided with a head portion having a holding flange of one diameter and a main flange of a larger diameter maintained in space relation whereby the male member is fixed to the decorative panel by inserting the holding flange into a key slot type aperture. The male member includes a shaft extending from the lower surface of the main flange and further includes a terminal bulbous engaging portion. The female member is provided with a hollow barrel body having a flanged head at the open end of said barrel and shoulder means for retaining the barrel in an aperture support panel. The female member is further provided with a plurality of axially extending ribs defining a first and second spherical cavity in spaced relation and adapted to accept the bulbous engaging portion in two axially spaced positions.

8 Claims, 5 Drawing Figures

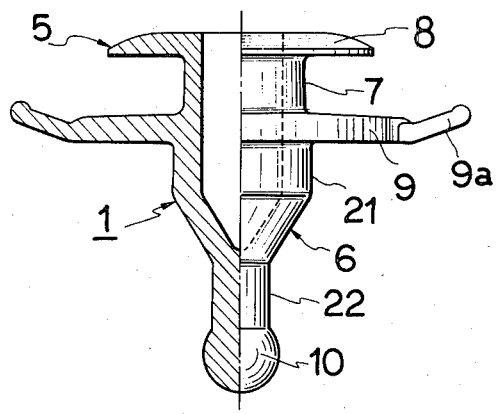
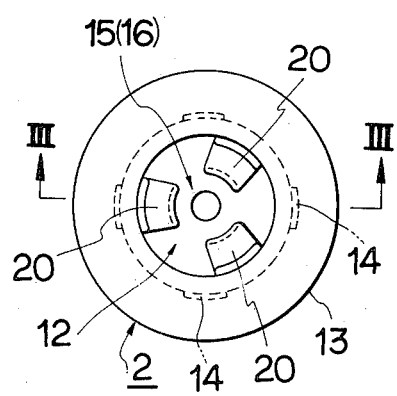
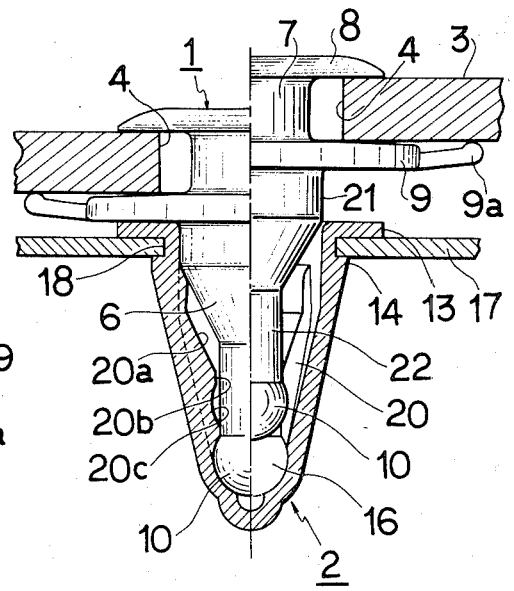
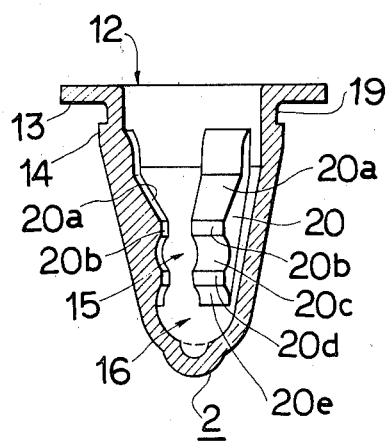

PANEL FASTENER

BACKGROUND OF THE INVENTION

This invention relates to a fixing device of the type to be used for fastening a decorative panel to a metal panel in a face-to-face union. More particularly the invention relates to an improved fixing device which is effectively used such as when a decorative panel serving to line an automobile door is fastened to the inner surface of the door.

Generally, the decorative panel which is used such as in lining the automobile body has its base plate coated on the surface with a sheeting material such as fabric or vinyl leather. When the decorative panel is fixed to the inner side of the automobile door, therefore, there must be retained a relationship that said sheeting material is attached fast on its rear surface to the door. For this reason, the fixing device used for fastening the decorative panel of this type generally has a construction such that it can be inserted on the fitting side of the decorative panel. Prior to the attachment of the decorative panel to the inside of the automobile door, this fixing device is inserted in the decorative panel in such a manner that, when the decorative panel is brought to confront the inside of the door, the engaging portion of the fixing device poses itself just in front of the fitting hole perforated in advance in the inside panel of the door. Then, the fixing device is forcibly driven into tight engagement with the fixing hole as by striking the surface of the decorative panel with a hammer, bringing the decorative panel into fast union with the inside of the door.

The fixing devices of this kind which have been suggested to date have a general construction which comprises a head portion adapted to be attached to the decorative panel and an engaging portion adapted to be engaged with the fitting hole perforated in a metal panel such as the inside sheet of the automobile door. The hear portion has two flanges, one larger than the other, opposed to each other across an intervening neck and the engaging portion has a shaft (or stud) extending from the outer surface of one of said flanges in the axial direction of the neck and shoulder means protruding radially from the outer surface of the shaft. The use of this device is accomplished by inserting the small-diameter flange of said head portion from behind the decorative panel into the fitting hole perforated in said panel until the neck is fully pierced through the hole and the panel is held securely between the small-diameter flange and large-diameter flange, bringing the aforementioned engaging portion to a position directly opposite the fitting hole in the panel simultaneously with opposing the decorative panel face to face to the metal panel as described above and subsequently hammering the shoulder means into hooked engagement with the edge of the fitting hole for thereby immobilizing the decorative panel against the metal panel.

Since the conventional fixing device can be fitted into position from behind the decorative panel and the fast engagement of the device with the metal panel can be accomplished simply by hammering the device from above the surface of the decorative panel overlying the device, the device is not affected in any way by the kind of the sheet-shaped cover and the decorative panel can be joined with the metal panel with ample tightness. Conversely, once the conventional fixing device is fastened to the panel by its engaging portion being driven home in the hole perforated in the panel, the shoulder means which have advanced past the perforated hole are brought into permanent engagement with the edge on the rear side of the hole and the device itself generally possesses no means of breaking this engagement. When there arises necessity for removing the decorative panel as when some built-in parts in the automobile door are to be replaced or given repairs, for example, the fixing device may be broken by removal. If, in this case, the removal of the decorative panel is accomplished simply by breaking the fixing device, then the damage to be suffered may be slight. Since the decorative panel is generally made of a material more brittle than the metal panel, however, it often happens that the decorative panel itself or the edge of the hole perforated in the decorative panel for admitting the head portion of the fixing device is broken sooner than the fixing device.

This invention has been accomplished with a view to solving the various problems described above. It is, accordingly, an object of this invention to provide a fixing device which is so adapted that the fixing device, when driven into a supporting panel of high strength such as a metal panel by the pressure applied from above the surface of a decorative panel in much the same way as the conventional fixing device, enables the decorative panel to be fastened onto the supporting panel and, on the other hand, where there arises necessity for removing the decorative panel from the supporting panel, the engagement between the two panels can easily be broken by forcing a suitable tool into the crack between the supporting panel and the decorative panel and prying the fixing device out of position.

SUMMARY OF THE INVENTION

To accomplish the object described above according to the present invention, there is provided a fixing device which is formed of a synthetic resin material such as polypropylene possessing suitable resiliency and surface slipperiness in combination with rigidity and which consists of a male member adapted to be fitted to a decorative panel and a female member adapted to be fitted to a supporting panel, said two members being so constructed that they are coupled with each other and consequently the decorative panel is fastened to the supporting panel by causing a shaft provided on the male member to thrust into a hollow space formed inside the female member and bringing an engaging portion formed at the leading end of said shaft into fast engagement with a spherical cavity formed inside said hollow space and, conversely, the union of the two members is broken and consequently the decorative panel is removed from the supporting panel by pulling the shaft out of the hollow space.

Another characteristic feature of the present invention resides in having the female member provided axially inside the hollow space thereof with two spherical cavities each adapted to admit the engaging portion formed at the leading end of the shaft of the male member, whereby the male and female members can be joined in a temporary engagement, viz. the female member can be fitted preparatorily onto the male member ready for attachment to the decorative panel by bringing the engaging portion of the shaft into engagement with the first spherical cavity situated closer to the opening of the hollow space and the union of the decorative panel with the supporting panel can be accomplished by inserting the female member into the fitting hole perforated in the supporting panel, pressing the decorative panel down for thereby bringing the female member into fast engagement with said fitting hole and, at the same time, advancing the engaging portion at the leading end of the shaft into the second spherical cavity and coupling the male and female members in a perfect engagement.

BRIEF EXPLANATION OF THE DRAWING

FIG. 1 is a front view of the male member of the fixing device, with the left half portion sectioned.

FIG. 2 is a plan view of the female member of the fixing device.

FIG. 3 is a sectioned view taken along the line III—III of FIG. 2.

FIG. 4 is a partially sectioned explanatory diagram illustrating the right half portion held in a state of temporary engagement and the left half portion held in a state of full engagement.

DETAILED DESCRIPTION OF THE INVENTION

Figure 5:
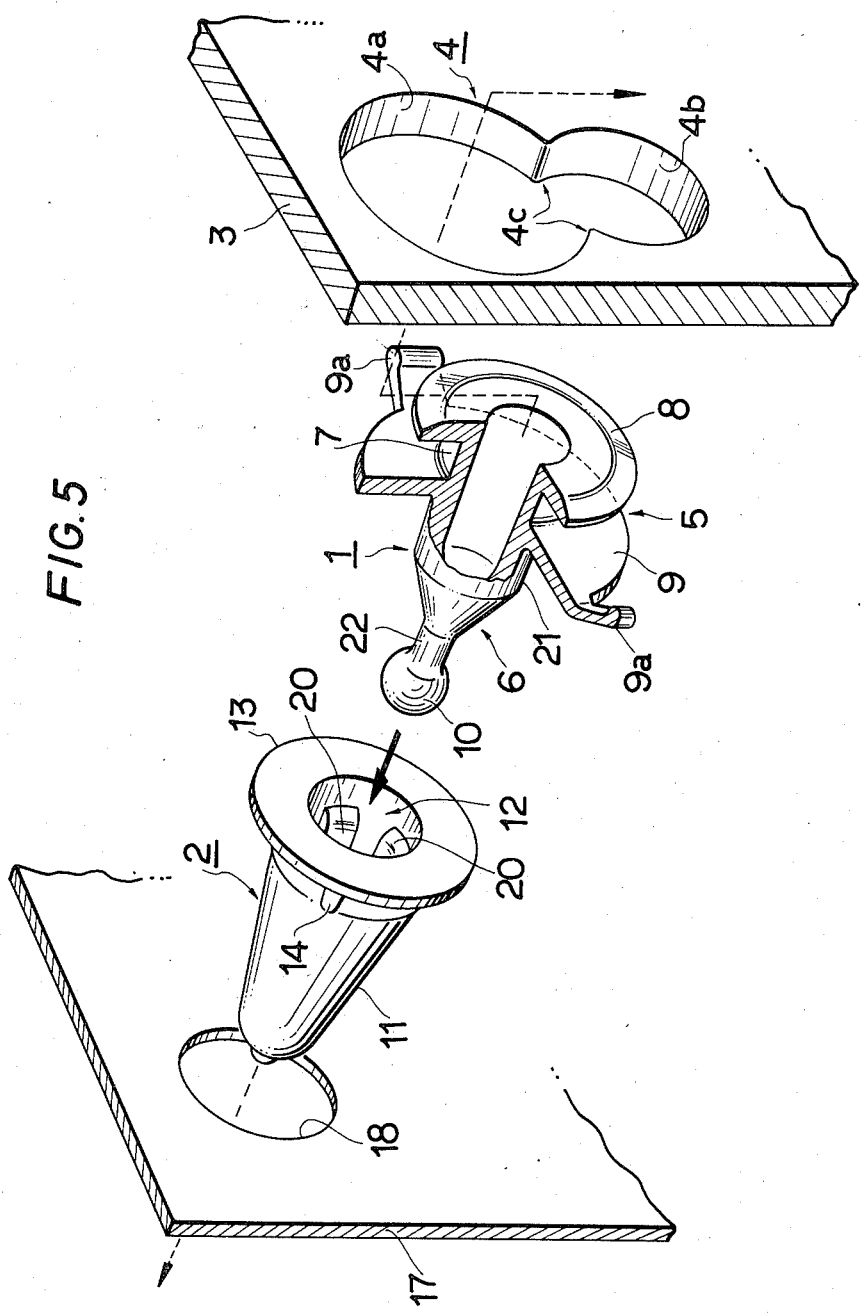
FIG. 5 is a partially cutaway exploded perspective view of the fixing device of the invention.

Now the characteristics of the present invention will be described in full detail with reference to the illustrated embodiment.

FIG. 1 represents a male member 1 of the fixing device according to this invention and FIG. 2 and FIG. 3 represent a female member 2 to be coupled with said male member 1.

The male member 1 is provided with a head portion 5 adapted to be engaged with a pyriform fitting hole 4 perforated in a decorative panel 3 and a shaft 6 adapted to be thrust into engagement with the female member 2. The head portion 5 has a holding flange 8 of a small diameter and a main flange 9 of a large diameter opposed to each other across an intervening neck 7 possessing a circular periphery. The shaft 6 extends perpendicularly from the lower surface of the main flange 9, opposite neck 7, in the axial line of the neck 7 and terminates in a bulbous engaging portion 10.

The pyriform fitting hole 4 perforated in the decorative panel 3 is formed of a circular hole 4a of a large diameter and a circular hole 4b of a small diameter which are partially joined with each other. The large-diameter hole 4a has a diameter which is greater than the diameter of said small-diameter holding flange 8 and smaller than the diameter of said large-diameter main flange 9. The small-diameter hole 4b which is partially joined with said large-diameter hole 4a has a diameter which is smaller than the diameter of the holding flange 8. The constriction 4c across which the two holes 4a, 4b communicates with each other has a dimension sufficient in size to permit passage of the neck 7 of the head portion 5.

The male member 1 is fastened to the fitting hole 4 by inserting the holding flange 8 from one side (actually the reverse side) of the decorative panel 3 into the large-diameter hole 4a until the main flange 9 collides into the panel surface and then causing the male member in its entirety to slide sidewise in the direction of the small-diameter hole 4b for thereby advancing the neck 7 past the constriction 4c into the small-diameter hole 4b and enabling the decorative panel to be held securely by the holding flange 8 and the main flange 9 because of the intimate contact of the opposite surfaces of the panel with said two flanges. In this case, the present embodiment equalizes the length of the neck 7 with the thickness of the decorative panel to enable the opposed surfaces of the holding flange 8 and the main flange 9 to come into effective planar contact with the opposite surfaces of the decorative panel, lest the head portion already received in the small-diameter hole 4b should not readily move out into the large-diameter hole 4a. Futher with a view to ensuring safe planar contact of the main flange 9, this embodiment provides the main flange on the outer periphery thereof with resilient pieces 9a, 9b protruding diagonally in the upward direction and separates the lower surface of the holding flange 8 and the leading ends of the resilient pieces 9a from each other by a vertical distance smaller than the thickness of the decorative panel 3 so that the extremities of said resilient pieces 9a will be resiliently pressed against the panel surface to have the decorative panel squeezed with added pressure between the main flange and the holding flange 8.

When the holding flange 8 is thrust into the large-diameter hole 4a and then moved sidewise into the small-diameter hole 4b in the process of fitting the male member 1 to the decorative panel 3, the handler at work is required to pinch the male member 1 by the shaft 6, press the upper surface of the main flange 9 against the decorative panel 3 with force enough for the resilient pieces 9a, 9a diagonally protruding from the outer periphery of the main flange to bend out temporarily against their resilience and then move the male member in situ in the direction of the small-diameter hole 4b. Then after the neck 7 has settled in its fixed position, the pressure exerted on the main flange is released. Consequently, the resilient pieces 9a, 9a act upon one side (reverse side) of the decorative panel 3 and squeeze the decorative panel in cooperation with the holding flange 8 now held on the other side of the panel, with the result that the male member is prevented from enjoying freedom of movement from said fixed position.

When the male member is attached to the decorative panel 3 as described above, the resilient pieces 9a provided on the main flange 9 are pressed against the one side of the panel and the male member 1 is consequently fastened to the panel by the panel itself being held securely between the main flange 9 and the holding flange. The squeezing force with which the decorative panel is held fast is such that even in the presence of a gap between the edge of the small-diameter hole 4b of the pyriform fitting hole 4 and the neck, said resilient pieces 9a function effectively to keep the male member securely in position and prevent it from freely moving out of position. When the fixing device is used to fasten the decorative panel to the metal panel on the automobile body, therefore, there is no possibility of the fixing device readily falling out of the fitting hole or moving out of position under external force. Thus, the fixing device of this invention can be used in a stable state at all times.

Since, in the fixing device of this invention, said resilient pieces 9a are extended from the outer periphery of the main flange 9 in the radial directions parting from the neck 7 of the head portion 5 and are adapted to act uniformly upon the lower surface of the holding flange 8, they enable the shaft 6 to be held constantley perpendicuar to the decorative panel 3 and consequently to be disposed perpendicularly relative to the fitting hole perforated in said panel for engagement with the shaft. In the illustrated embodiment, one pair of such resilient pieces are symmetrically disposed on the neck. When necessary, three or four such resilient pieces may be equiangularly disposed on the outer periphery of the main flange so as to extend radially in three or four directions.

The female member 2 with which said male member 1 is to be coupled has, as its main body, a hollow barrel 11 substantially of the shape of an inverted cone and it has an annular fitting flange or head 13 provided on the periphery of the opening 12 of said barrel 11 and a plurality of shoulder means 14 provided on the outer surface of the barrel 11 in such a manner as to be axially spaced from and opposed to the lower surface of the annular fitting flange 13. In the depth of the empty space embraced in the barrel 11, two spherical cavities 15, 16 are disposed each adapted to engage the bulbous engaging portion 10 formed at the leading end of the shaft 6 of the male member 1.

The barrel 11 of the female member in the present embodiment is so formed that the largest outside diameter thereof at the opening 12 is equal to or slightly smaller than the inside diameter of a hole 18 perforated in a supporting panel 17. Conversely, the shoulder means 14 protrude from the outer surface of the barrel 11 so that their outermost radial extent falls on an imaginary circle having a diameter greater than the inside diameter of said hole 18. The extremities of the shoulder means 14 closer to the barrel 11 are separated from the lower surface of the fitting flange 13 to form a gap or groove 19 for admitting the edge of said hole 18 between said extremities and the fitting flange 13.

The bore in the barrel 11 is formed with a depth sufficient to accept the entire length of the shaft 6 of the female member inclusive of the bulbous engaging portion 10. On the inner wall of this bore in the barrel there are provided three raised axially extending ribs, each of a profile designed to form said spherical cavities 15, 16 which are formed equidistantly in the axial direction of the barrel.

The raised ribs 20 are situated substantially at the center of the depth of the empty bore as illustrated in FIG. 4. Each of the raised ribs consists, in the direction from the opening 12 side toward the inside bottom of the barrel 11, of an inclined face 20a oriented toward the inside bottom, a face 20b parallel to the axis of the barrel 11, a concavely arcuate face 20c, a face 20d parallel to the axis and a semi-arcuate face 20e inclined toward the inside bottom of the barrel in the manner of a continued range of mountains. The three raised ribs are disposed substantially parallel and circumferentially spaced at fixed intervals on the inside wall of the barrel 11, whereby the three parallel faces 20b jointly form a substantially annular step, the three arcuate faces 20c form a substantially spherical (first) cavity 15, the three parallel faces 20d form a second annular step and the three arcuate faces 20e form in conjunction with the inside bottom of the barrel a spherical (second) cavity 16. Further, the inclined faces 20a in the portions of said raised ribs 20, closest to the opening 12, jointly form a guide portion which serves to guide the engaging portion 10 formed at the leading end of the shaft 6 of the male member 1 into the cavity 15 formed as described above.

The two cavities 15, 16 are defined by said arcuate faces 20c and 20e which fall on imaginary spheres spacious enough for admitting the bulbous engaging portion 10 of the male member. The engaging portion 10 which is pushed into the empty bore of the barrel 11 through the guide portion formed by the inclined faces 20a spreads out the step formed by the parallel faces 20b and enters the first cavity 15 to be retained therein. As the shaft 6 of the male member 1 is further pushed into the bore of the barrel 11, the engaging portion 10 spreads out the second step defined by parallel faces 20d and enters the second cavity 16 to be held fast therein. In this case, in order that greater resistance is offered to the engaging portion 10 when the engaging portion enters the second cavity 16 than when it enters the first cavity 15, i.e. that the second cavity exerts greater holding strength upon the engaging portion than the first cavity, the present embodiment has said raised ribs so formed that the relative diameter of the second step is slightly smaller than that of the first step.

In this embodiment, the shaft 6 of the male member is so formed that its base portion 21 which joins the main flange 9 has an outside diameter equal to or slightly smaller than the inside diameter of the opening 12 of the barrel 11 of the female member 2. Along in the middle of the entire length of the shaft 6, the outside diameter is gradually decreased downwardly. The tapered portion of the shaft 6 terminates in a small neck 22 which is joined to the shaft 6 and the enlarged generally spherical engaging portion 10. This small neck 22 defines a diameter smaller than the diameters of the first and second steps formed inside the bore of the barrel 11, so that the small neck will never spread out these steps after the engaging portion 10 has entered the cavities 15, 16. The base portion 21 has a length equalling the axial distance between the two cavities 15, 16 so that it will be positioned outside the opening 12 when the engaging portion 10 is received tightly in the first cavity 15 and it will be completely stowed inside the opening when the engaging portion is shifted into the second cavity 16.

The female member 2 which is generally complementary to the male member 1 may be attached to the hole 18 perforated in the supporting panel 17 by inserting the barrel 11 thereof into said hole 18 and then pressing it down until the lower surface of the fitting flange 13 contacts one surface of the panel 17 and the shoulder means 14 formed on the outer surface of the barrel advance past the entire thickness of the panel. As the female member is thus inserted into the hole 18, the shoulder means 14 which have slid past the panel substantially regain their original shape and sizes behind the panel by virtue of resiliency and come into hooked engagement with the edge of the hole, said hooked engagement serving to preclude possible separation of the female member 2 from the panel. Consequently, the female member 2 is fastened securely to the supporting panel.

The preferred method of fastening a decorative panel to the supporting panel by use of the fixing device of this invention constructed as described above will now be explained. First, the head portion 5 of the male member 1 is set into the pyriform fitting hole 4 by the method described above, with the shaft 6 protruding from the surface of the decorative panel. Then, a female member 2 is positioned adjacent each shaft 6 in such a manner as to almost embrace the shaft and then pushed axially to have the shaft 6 received inside the barrel 11, with the engaging portion 10 at the leading end of the shaft led in by the guide portion formed of the raised ribs on the inner wall of the barrel 11, until the engaging portion 10 snaps into fast engagement with the first cavity 15, thereby bringing the male and female members into temporary union. After the two members have been brought into temporary union as described above, the barrel 11 of each female member 2 is inserted into a hole 18 perforated in the supporting panel 17. By means of impacts produced on the surface of the decorative panel 3 such as with a hammer, the female member 2 is driven home and fastened to the hole 18 and, at the same time, the engaging portion 10 received previously into temporary engagement inside the first cavity 15 is pushed further into the second cavity 16, bringing the two members into permanent union. Consequently, the decorative panel 3 is fastened to the supporting panel 17.

Because use of the fixing device of this invention enables the male member 1 to be attached to the rear surface of the decorative panel and the female member 2 to be also joined with the male member 1 in the form of temporary engagement, it follows that desired fastening of the decorative panel to the supporting panel can be accomplished by a very simple procedure of groping for and locating the hole 18 perforated in the supporting panel, inserting the barrel 11 of the female member into the hole 18 and subsequently striking the surface of the decorative panel for thereby driving the shaft 6 of the female member into the barrel 11. Particularly in the case of a part consisting of two members such as those of the fixing device of this invention, the fact that the two members can be joined in advance proves high convenient for the sake of management of parts. The work of first causing a plurality of female members to be attached in advance to as many male members and subsequently pushing all the coupled fixing devices at once into the holes perforated in the supporting panel is slighty more efficient and more convenient than the work which generally requires the plurality of fixing devices to be pushed and fastened one after another into the holes perforated for the purpose of attachment of one decorative panel. In the actual work, the fixing device of this invention is attached to the hole perforated in the supporting panel, with its male and female members kept in a coupled state. Because of the particular construction of the female member, however, the final fastening of the fixing device can also be accomplished by first attaching the female member alone to the hole and then bringing into engagement with this female member the male member which has been fitted in advance to the decorative panel.

Because, in the fixing device of this invention, the engaging portion 10 provided at the leading end of the shaft of the male member 1 is formed in a generally spherical shape and the two cavities 15, 16 provided inside the barrel 11 of the female member 2 for accepting said engaging portion 10 are each formed in a spherical shape corresponding to the shape of the engaging portion, a pull given to the shaft with a force equalling the force exerted at the time of engagement enables the engaging portion to move out of the cavity and slide over the step encircling the entrance to the empty space inside the barrel 11. Consequently the two members can be separated and the decorative panel can be removed from mounted position on the supporting panel. Of course in this case, the separation of the two panels necessitates inserting a suitable tool in the crack between the supporting panel and the decorative panel and prying one panel off the other panel. The fact that the decorative panel can be removed provides access so the parts used inside the door can be replaced, inspected and otherwise handled with much greater ease and convenience than the conventional fixing device of the same class.

Further, the fixing device of the present invention is so constructed that when the engaging portion 10 at the leading end of the shaft previously brought into temporary engagement in the first cavity is pushed further into the second cavity to be retained more securely therein, the base portion 21 of the shaft 6 is stowed completely inside the opening of the female member to fill up the empty space therein, prevent the barrel from bending inwardly and preclude possible release of the shoulder means 14. Thus, the female member can never escape from the hole in the supporting panel unless the union of the male and female members is broken. The fixing device, accordingly, ensures fast attachment of the decorative panel.

In the preferred embodiment described above, the raised ribs 20 each in the shape of a range of mountains are formed along the axial direction of the barrel 11 for the purpose of providing two cavities 15, 16 inside the bore of the barrel of the female member. The particular disposition of said raised ribs eliminates the problems involved in the fabrication of the female member and aims to provide effective expansion of the barrel during the insertion and extraction of the engaging portion 10. This invention is not limited to this embodiment. For example, a modification aimed at providing the two cavities as by forming continuous annular steps of a cross section resembling that of a wave at fixed intervals in the axial direction on the inner wall of the barrel does not contradict the object of the present invention. Permissibility of such a modification also applies to the shoulder means which are provided on the outer surface of the barrel. A shoulder means formed in the shape of an annular step, not shown, at a position corresponding to that of the fitting flange 13 can bring about substantially the same effect as that produced by the shoulder means of the embodiment described above. In short, all the raised ribs formed on the inside wall of the barrel, are designed to take into consideration both the ease of release from metal dies used at the time of fabrication and with a view to facilitating the elastic deformation during the attachment of the female member to the hole in the supporting panel and during the union of the female and male members.

What is claimed is:

1. A plastic fixing device for mounting a decorative panel on an apertured supportng panel comprising a male member adapted to be fastened to said decorative panel and a female member adapted to be attached to said apertured supporting panel, which device is characterized by the fact that said male member is provided with head means for fastening said male member to the decorative panel, said male member further including a shaft extending from the said head means and terminating in a bulbous engaging portion, said female member including a hollow barrel open at one end, a fitting flange extending outwardly from the periphery of the opening at one end of said barrel and shoulder means protruding from the outer surface of the barrel so that the female member can be attached to said supporting panel by inserting said barrel through a hole perforated in the supporting panel, said female member barrel is further provided inside the hollow interior thereof with a first spherical cavity and a second spherical cavity co-axially spaced so that when the shaft of said male member is telescopically received through the end opening into the hollow barrel interior of the female member and the male and female members are brought into temporary engagement by driving said shaft to a first position of insertion by seating the bulbous engaging portion in said first spherical cavity, the two members are brought into full engagement by axially driving the shaft to a second position of insertion and thereby seating the bulbous engaging portion in said second spherical cavity, whereby the decorative panel is fastened to the supporting panel.

2. The fixing device according to claim 1, wherein said shaft is provided with a base portion extending from the lower surface of the head means of the male member said base portion has a diameter equal to or slightly smaller than the inside diameter of the opening to the empty space inside the barrel of the female member and, at the same time, the shaft is formed in a length such that the base portion is positioned outside the barrel when the bulbous engaging portion at the leading end of the shaft is brought into engagement with the first spherical cavity inside the barrel and the base portion is substantially completely positioned inside the opening of the barrel when the engaging portion is axially moved to the second spherical cavity.

3. The fixing device according to claim 1, wherein the barrel of said female member has the shape of an inverted cone with its diameter gradually decreased in the direction away from said open end and fitting flange toward an opposite end and the second spherical cavity is formed at the lower portion of the empty space at said opposite end in the barrel.

4. The fixing device according to claim 3, wherein said opposite end of said barrel is closed and the inner wall of the barrel of said female member includes a plurality of circumferentially spaced raised axial ribs each having in axial cross-section and each presenting on the exposed side thereof facing the axis of said barrel in consecutive order descending axially from the open end an upwardly slanted face, a flat face, an inwardly arcuate face, a flat face and a semi-arcuate face formed at required intervals in the axial direction whereby the inwardly arcuate faces of said raised ribs jointly form the first spherical cavity and the semi-arcuate faces of the raised ribs along with the closed end of said barrel jointly form the second spherical cavity.

5. The fixing device according to claim 1, wherein the head means of said male member includes a main flange and a holding flange maintained in spaced relation by a reduced neck portion, the periphery of said main flange of said male member is integrally provided with resilient arms having the extremities thereof extended toward said holding flange opposed to said main flange.

6. The fixing device according to claim 5, wherein the resilient arms provided on said periphery of the main flange are radially extended from said periphery.

7. The fixing device according to claim 5, wherein at least one pair of resilient arms are symmetrically disposed relative to the axis of the main flange.

8. The fixing device according to claim 5, wherein the vertical distance between the extremities of the resilient arms and the opposed face of said holding flange is smaller than the thickness of the panel to which said male member is attached.

* * * * *